June 13, 1961 R. G. AMES 2,988,243
WALLBOARD CEMENT-RECEIVING PAN WITH A WIPER BLADE
Filed Nov. 23, 1959
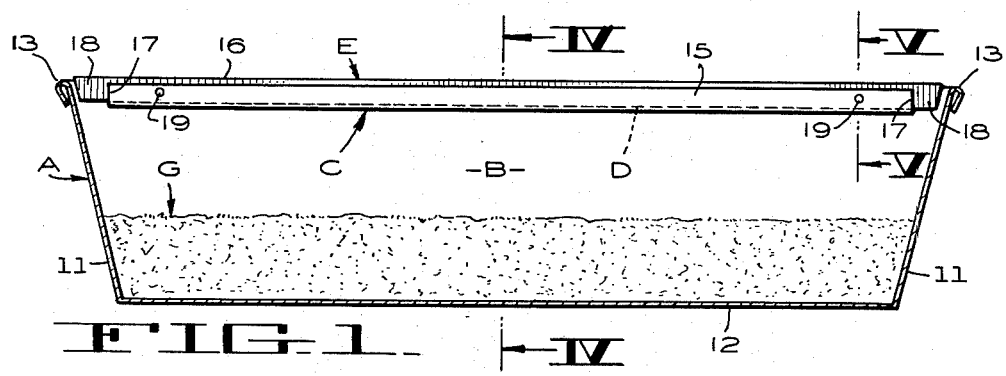
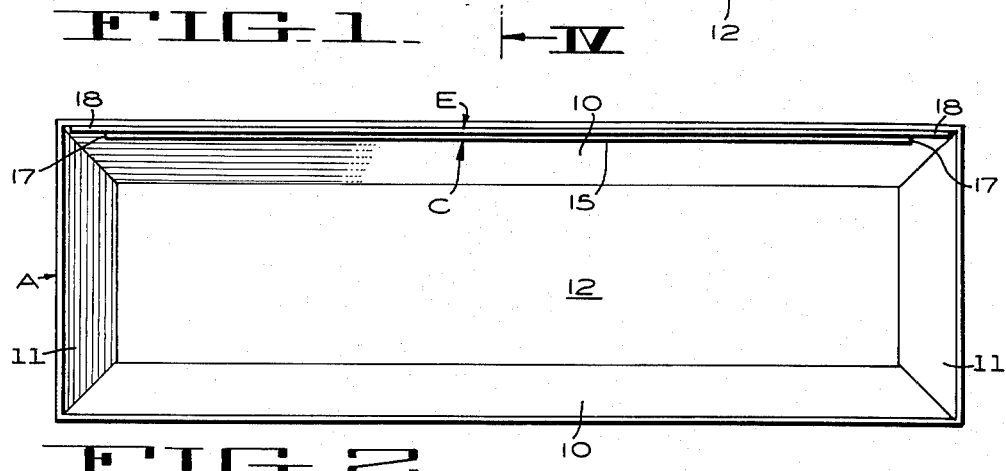
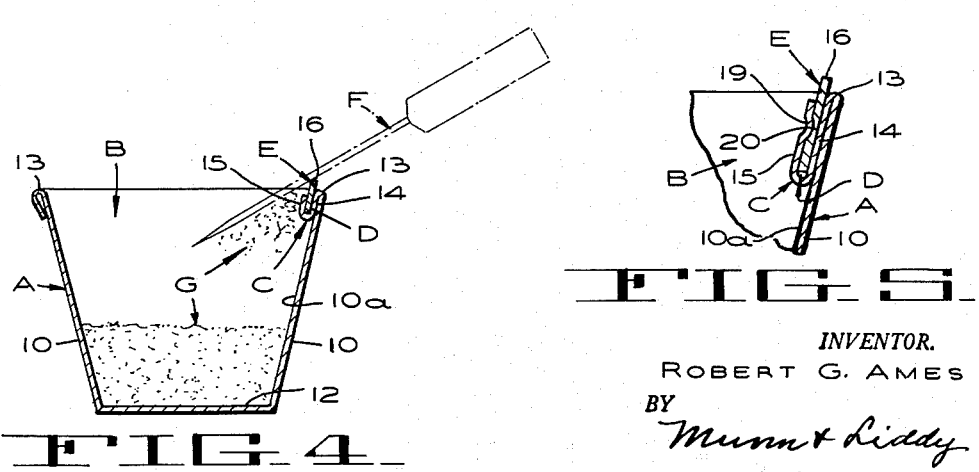
INVENTOR.
ROBERT G. AMES
BY
Munn & Liddy
ATTORNEYS United States Patent Office 2,988,243
Patented June 13, 1961

2,988,243
WALLBOARD CEMENT-RECEIVING PAN
WITH A WIPER BLADE
Robert G. Ames, 505 O'Neill Ave., Hillsborough, Calif.
Filed Nov. 23, 1959, Ser. No. 854,761
3 Claims. (Cl. 220—90)

In the building construction art, it is common practice at the present time to abut wallboards, and to cover the joints therebetween by cement and tape. When utilizing nozzles for applying the cement, it is necessary at times to remove excess cement by using a broad knife, or the like. Also, in smaller jobs the cement is applied to the joints by a broad knife, or the like. Regardless of which method is employed, the problem here is to remove cement from the broad knife, or the like.

As the cardinal object of my invention, it is proposed to provide a cement-receiving pan which has a wiper blade removably secured thereto by a blade-holding clip, the blade having an exposed edge over which a broad knife, or the like, may be drawn to remove cement therefrom. The blade is located so that the cement will fall directly into a compartment of the pan as it is removed from the knife, or the like. The pan is designed to receive excess cement which has been removed from wallboard joints, or the pan may hold a supply of cement that may be applied to the joints by the knife.

More particularly stated, I propose to provide a blade holding clip that is secured to one of the side walls of a pan to extend longitudinally of the pan, the clip defining an upwardly-opening groove into which the wiper blade may be removably inserted. The blade may be removed from time to time so as allow cement to be cleaned out of the groove, and a new blade to be inserted, if required.

Other objects and advantages will appear as the specification continues. The novel features of the invention will be set forth in the appended claims.

*Drawing*

For a better understanding of my invention, reference should be had to the accompanying drawing, forming part of this specification, in which:

FIGURE 1 is a longitudinal sectional view of my wallboard cement-receiving pan with a wiper blade;

FIGURE 2 is a top plan view thereof;

FIGURE 3 is a face view of the wiper blade by itself;

FIGURES 4 and 5 are transverse sectional views taken along the planes IV—IV and V—V, respectively, of FIGURE 1.

While I have shown only the preferred form of my invention, it should be understood that various changes, or modifications, may be made within the scope of the annexed claims without departing from the spirit thereof.

*Detailed description*

In carrying my invention into practice, I provide a pan indicated generally at A having opposite side walls 10, a pair of end walls 11, and a bottom wall 12, all of these walls being joined together to form a compartment B. The pan has a marginal rim 13 at its top.

It will be noted that an elongated blade-holding clip C is secured to one of the side walls 10 to extend longitudinally of the pan A. As clearly shown in FIGURES 4 and 5, this clip is disposed adjacent to the marginal edge 13 of the side wall 10 to which it is secured. This clip is U-shaped in transverse section, and defines an upwardly-opening groove D extending lengthwise of the pan. Moreover, a wiper blade E is removably disposed in the groove D to extend substantially from one end wall 11 to the other (see FIGURES 1 and 2).

In its structural features, an extension on one of the side walls 10 is crimped inwardly and downwardly to form a first flange 14 that contacts with the inner surface 10a of this side wall. Then this extension is crimped upwardly to provide a second flange 15 which is spaced from the first flange 14 so as to provide the groove D therebetween. Thus the blade-holding clip C bears directly against the side wall 10 of the pan to which it is secured for support thereby.

The wiper blade E has an upper exposed edge 16 over which a broad knife F, or the like, may be drawn to remove wallboard cement G from the knife (see FIGURE 4). This wiper blade is located so that the cement will fall directly into the compartment B as it is removed from the knife, or the like.

Turning now to FIGURES 1 and 2, it will be observed that the blade-holding clip C has opposite ends 17, each being spaced from an adjacent end wall 11 of the pan A. The wiper blade E has its opposite end portions 18 projecting into the spaces between the ends 17 of the clip and the end walls 11 of the pan. The projecting end portions 18 of the blade are exposed so that a person's fingers may be engaged therewith to facilitate removal of the blade E from the groove D of the clip C. While I have shown this arrangement at both ends 18 of the wiper blade, it may be provided at only one end, if desired.

The upper exposed edge 16 of the blade E is disposed at an elevation above the top marginal rim 13 of the side wall 10 of the pan to which the clip C is secured, whereby the broad knife F, or the like, may be moved into various angular positions relative to the wiper blade while maintaining contact with the latter.

For the purpose of removably retaining the wiper blade E in the blade-holding clip C, I have provided detents 19 on the flange 15. These detents may snap into depressions or openings 20 formed in the wiper blade, when the latter is inserted into the groove D (see FIGURES 1, 3 and 5).

The wiper blade E is preferably made of spring steel; it may be removed and one of its end portions 18 drawn along the groove D to clean any cement G out of this groove. The steel blade E will wipe the knife F clean, because of the sharp corners of the edge 16. Of course, when the wiper blade becomes worn, it may be replaced by a new blade.

I claim:

1. In a wallboard cement-receiving pan with a wiper blade: a pan providing opposite side walls, a pair of end walls, and a bottom wall; the pan defining a compartment, and having a marginal rim at its top; a substantially straight elongated blade-holding clip secured to one of the side walls to extend longitudinally of the pan; the clip being disposed in the compartment adjacent to the marginal rim of the side wall to which it is secured, and defining an upwardly-opening groove extending lengthwise of the pan; and a substantially straight wiper blade removably disposed in the groove of the clip to extend substantially from one end wall of the pan to the other; the blade having an upper exposed edge over which a broad knife, or the like, may be drawn to remove wallboard cement from the knife, or the like; the blade being located so that the cement will fall into the compartment of the pan as it is removed from the knife, or the like; the blade being removable from the groove in an upward direction; the blade-holding clip bearing directly against the side wall of the pan to which it is secured to thereby support both the clip and the blade, when the broad knife, or the like, is drawn over the blade in contact therewith.

2. In a wallboard cement-receiving pan with a wiper blade: a pan providing opposite side walls, a pair of end walls, and a bottom wall; the pan defining a compartment and having a marginal rim at its top; a substantially straight elongated blade-holding clip secured to one of the side walls to extend longitudinally of the pan; the clip being disposed in the compartment adjacent to the marginal rim of the side wall to which it is secured, and defining an upwardly-opening groove extending lengthwise of the pan; and a substantially straight wiper blade removably disposed in the groove of the clip to extend substantially from one end wall of the pan to the other; the blade having an upper exposed edge over which a broad knife, or the like, may be drawn to remove wallboard cement from the knife, or the like; the blade being located so that the cement will fall into the compartment of the pan as it is removed from the broad knife, or the like; the blade being removable from the groove in an upward direction; the blade-holding clip having opposite ends, each being spaced from an adjacent end wall of the pan; the wiper blade having its opposite end portions projecting into the spaces between the ends of the clip and the end walls of the pan; the projecting end portions of the blade being exposed so that a person's fingers may be engaged thereunder to facilitate lifting of the blade from the groove of the clip.

3. In a wallboard cement-receiving pan with a wiper blade: a pan providing opposite side walls, a pair of end walls, and a bottom wall; the pan defining a compartment, and having a marginal rim at its top; a substantially straight elongated blade holding clip secured to one of the side walls to extend longitudinally of the pan; the clip being disposed in the compartment adjacent to the marginal rim of the side wall to which it is secured, and defining an upwardly-opening groove extending lengthwise of the pan; and a substantially straight wiper blade removably disposed in the groove of the clip to extend substantially from one end wall of the pan to the other; the blade having an upper exposed edge over which a broad knife, or the like, may be drawn to remove wallboard cement from the knife, or the like; the blade being located so that the cement will fall into the compartment of the pan as it is removed from the knife, or the like; blade being removable from the groove in an upward direction; at least one end of the blade-holding clip being spaced from an adjacent end wall of the pan; the wiper blade having an end portion projecting into this space, and said end portion being exposed so that a person's finger may be engaged thereunder to facilitate lifting of the blade from the groove of the clip.

References Cited in the file of this patent

UNITED STATES PATENTS

| 540,129 | Wohltman | May 28, 1895 |
| 2,767,891 | Beadles | Oct. 23, 1956 |
| 2,914,787 | Hartkopf | Dec. 1, 1959 |

UNITED STATES PATENT OFFICE
CERTIFICATE OF CORRECTION

Patent No. 2,988,243                          June 13, 1961

Robert G. Ames

It is hereby certified that error appears in the above numbered patent requiring correction and that the said Letters Patent should read as corrected below.

In the heading to the printed specification, line 4, for "Robert G. Ames, 505 O'Neill Ave., Hillsborough, Calif." read -- Robert G. Ames, Hillsborough, Calif. (505 O'Neill Ave., Belmont, Calif.) --.

Signed and sealed this 28th day of November 1961.

(SEAL)
Attest:

ERNEST W. SWIDER                            DAVID L. LADD
Attesting Officer                                Commissioner of Patents